US012486079B2

(12) United States Patent
Plourde et al.

(10) Patent No.: US 12,486,079 B2
(45) Date of Patent: *Dec. 2, 2025

(54) BIODEGRADABLE ZIPPER FOR ZIP PACKAGING

(71) Applicant: Illinois Tool Works Inc., Glenview, IL (US)

(72) Inventors: Eric P. Plourde, Frankfort, IL (US); Christine N. Shimel, Chicago, IL (US); Lars G. Wihlborg, Stratford, CT (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/446,697

(22) Filed: Aug. 9, 2023

(65) Prior Publication Data

US 2023/0399147 A1 Dec. 14, 2023

Related U.S. Application Data

(63) Continuation of application No. 17/160,469, filed on Jan. 28, 2021, now Pat. No. 11,905,070.

(Continued)

(51) Int. Cl.
*B65D 33/25* (2006.01)
*B65D 30/08* (2006.01)
(Continued)

(52) U.S. Cl.
CPC ......... *B65D 33/2584* (2020.05); *B65D 31/04* (2013.01); *B65D 33/2541* (2013.01);
(Continued)

(58) Field of Classification Search
CPC ....... B29L 2031/7282; B29L 2031/729; C08L 29/04; C08L 97/02; C08L 31/04;
(Continued)

(56) References Cited

U.S. PATENT DOCUMENTS 5,400,568 A * 3/1995 Kanemitsu ......... B65D 33/2533
53/139.2
5,506,036 A * 4/1996 Bergerioux ............. B32B 27/10
428/483

(Continued)

FOREIGN PATENT DOCUMENTS

CN 102532836 A * 7/2012
CN 203073164 U * 7/2013
(Continued)

*Primary Examiner* — Michael C. Romanowski
(74) *Attorney, Agent, or Firm* — Maxwell J. Petersen; FisherBroyles. LLP

(57) ABSTRACT

A biodegradable (repulpable, compostable and/or water soluble) zipper is provided for attachment to a biodegradable flexible package. The biodegradable zipper is formed using a water-soluble polymer that can be combined with a repulpable and/or compostable material, such as a plant-based cellulose material. The biodegradable zipper enables the biodegradable package to be opened and closed by the consumer, so that the consumer has the option to determine, change or manipulate the contents of the biodegradable flexible package.

18 Claims, 2 Drawing Sheets

Related U.S. Application Data

(60) Provisional application No. 62/988,448, filed on Mar. 12, 2020.

(51) Int. Cl.
    *B65D 65/38*     (2006.01)
    *B65D 65/46*     (2006.01)
    *C08L 1/26*     (2006.01)
    *C08L 29/04*     (2006.01)
    *C08L 97/02*     (2006.01)
    *D21H 17/36*     (2006.01)

(52) U.S. Cl.
CPC ............... *B65D 65/46* (2013.01); *C08L 1/26* (2013.01); *C08L 29/04* (2013.01); *C08L 97/02* (2013.01); *B65D 33/25* (2013.01); *B65D 33/2508* (2013.01); *B65D 65/38* (2013.01); *D21H 17/36* (2013.01)

(58) Field of Classification Search
CPC ........ C08L 1/26; C08J 2329/04; D21H 17/36; Y02W 90/10; C09D 129/04; B29K 2023/083; B29K 2031/04; B29K 2311/10; B29K 2311/12; B65D 33/1683; B65D 33/25; B65D 33/2508; B65D 33/2541; B65D 33/2584; B65D 33/2589
USPC ............. 383/61.3, 97; 428/34.1–36.92
See application file for complete search history.

(56) References Cited

U.S. PATENT DOCUMENTS

| | | | | |
|---|---|---|---|---|
| 5,520,463 | A * | 5/1996 | Tilman | B65D 33/2541 383/63 |
| 5,809,621 | A * | 9/1998 | McCree | B65D 33/2541 24/585.12 |
| 5,849,401 | A * | 12/1998 | El-Afandi | B32B 27/08 264/572 |
| 5,950,285 | A * | 9/1999 | Porchia | B65D 33/259 24/585.12 |
| 6,063,067 | A * | 5/2000 | Takizawa | A61F 13/5512 428/350 |
| 6,071,011 | A * | 6/2000 | Thomas | B65D 33/2508 383/203 |
| 6,213,641 | B1 * | 4/2001 | Price | B65D 31/00 383/104 |
| 6,960,374 | B1 * | 11/2005 | Terada | B32B 27/08 383/61.3 |
| 7,070,865 | B2 * | 7/2006 | Berube | C08K 5/0091 524/577 |
| 7,874,731 | B2 * | 1/2011 | Turvey | B65D 81/2023 383/103 |
| 2003/0077007 | A1 * | 4/2003 | Turvey | B65D 33/007 383/33 |
| 2004/0070111 | A1 * | 4/2004 | Hsieh | B29D 5/02 525/54.31 |
| 2004/0234170 | A1 * | 11/2004 | Pawloski | B65D 33/2566 383/63 |
| 2004/0252916 | A1 * | 12/2004 | Smith | B65D 33/25865 383/64 |
| 2006/0168776 | A1 * | 8/2006 | Dais | B65D 33/2541 24/401 |
| 2006/0265843 | A1 * | 11/2006 | Ackerman | B65D 33/2508 24/415 |
| 2006/0285773 | A1 * | 12/2006 | Shaffer | B65D 33/2508 24/585.12 |
| 2006/0286320 | A1 * | 12/2006 | Green | D21H 17/36 428/510 |
| 2009/0297071 | A1 * | 12/2009 | Koenigkramer | B65D 33/2508 383/103 |
| 2010/0008603 | A1 * | 1/2010 | Smith | B65B 51/225 29/527.2 |
| 2011/0097018 | A1 * | 4/2011 | Turvey | B65D 33/01 383/63 |
| 2011/0283488 | A1 * | 11/2011 | Anzini | B65D 33/2566 24/405 |
| 2011/0311169 | A1 * | 12/2011 | Smith | B65D 33/255 493/213 |
| 2012/0014622 | A1 * | 1/2012 | Schwallie | B65D 33/065 383/105 |
| 2013/0174386 | A1 * | 7/2013 | Koenigkramer | B65D 33/2508 24/415 |
| 2013/0195384 | A1 * | 8/2013 | Dais | B65D 33/255 383/105 |
| 2014/0093195 | A1 * | 4/2014 | Dais | B65D 33/2566 383/65 |
| 2014/0120277 | A1 * | 5/2014 | Vonfelden | D21H 19/12 428/514 |
| 2014/0272163 | A1 * | 9/2014 | Tilton | B27N 3/04 427/427.4 |
| 2015/0071572 | A1 * | 3/2015 | Dreher | B65D 29/00 383/105 |
| 2015/0291752 | A1 * | 10/2015 | Sumnicht | D01F 6/14 524/34 |
| 2016/0208087 | A1 * | 7/2016 | Virtanen | D21H 11/20 |
| 2016/0362841 | A1 * | 12/2016 | Fretz | D21H 17/36 |
| 2019/0092931 | A1 * | 3/2019 | Glenn | B29B 13/02 |
| 2020/0040163 | A1 * | 2/2020 | Cigada | C08L 3/02 |
| 2022/0153477 | A1 * | 5/2022 | Giusti | D21H 27/06 |
| 2023/0159242 | A1 * | 5/2023 | Miranda | B32B 27/36 428/34.3 |

FOREIGN PATENT DOCUMENTS

| | | | | |
|---|---|---|---|---|
| JP | H09296087 | A | * | 11/1997 |
| JP | 2000264343 | A | * | 9/2000 |
| KR | 102001938 | B1 | * | 7/2019 |
| WO | WO-2015063365 | A1 | * | 5/2015 ............... B27N 3/04 |

* cited by examiner

BIODEGRADABLE ZIPPER FOR ZIP PACKAGING

RELATED APPLICATIONS

This application is a continuation of U.S. application Ser. No. 17/160,469, which in turn claims priority based on U.S. Provisional Application 62/988,448, filed on Mar. 12, 2020, both disclosures of which are incorporated herein by reference in their entireties.

FIELD OF THE INVENTION

This invention is directed to a biodegradable (repulpable, compostable and/or water soluble) zipper having a water-soluble polymer component, useful for biodegradable flexible zip packages, and a biodegradable flexible zip package that includes the biodegradable zipper.

BACKGROUND OF THE INVENTION

Flexible packages that dissolve in water have found use for packaging dry, granulated soaps such as laundry and dishwasher soaps, chemical additives, industrial cleaners, paint mixing, and other uses where pre-measured quantities of a substance are advantageous. For example, water-soluble flexible packages made from polyvinyl alcohol can dissolve in water and many other liquids, causing release of the package contents.

Repulpable and/or compostable packages made from cellulose materials have found increasing use as the demand for biodegradable materials increases. As with flexible packages that dissolve in water, flexible packages that are repulpable and/or compostable have generally been limited to use with pre-measured quantities of foods and other contents. Until now, these packages have been pre-filled by the manufacturers and closed using heat sealing, gluing, and similar techniques. The consumer does not have a convenient way to open the packages and vary the contents before using them. Consumers must typically accept the pre-measured quantities of ingredients and do not have the flexibility to vary them. Moreover, consumers do not have a convenient way to prepare their own water-soluble, repulpable and/or compostable packages containing pre-measured quantities of ingredients, because such packages cannot be readily closed and sealed by the consumers.

Until now, flexible packages that are re-closeable have generally been constructed of plastics that are neither water-soluble nor repulpable or compostable. The entire field of flexible packages whose contents are determined by consumers has been dominated by non-biodegradable materials. Re-closeable sandwich bags and other re-closeable food packages are typically non-biodegradable.

There is a need or desire in the art for biodegradable (repulpable, compostable and/or water-soluble) flexible packages that can be opened and closed by consumers.

There is also a need or desire in the art for pre-packaged biodegradable (repulpable, compostable and/or water-soluble) flexible packages whose contents can be readily varied at the consumer level.

There is also a need or desire for biodegradable (repulpable, compostable and/or water-soluble) flexible packages that can be filled by consumers with desired contents to desired levels, sealed, and stored for future use.

SUMMARY OF THE INVENTION

The present invention is directed to a biodegradable (repulpable, compostable and/or water-soluble) re-closeable flexible package and a biodegradable zipper for a biodegradable flexible package. The biodegradable zipper can be repulpable, compostable or water soluble, or a combination thereof. The biodegradable zipper enables the production of fully biodegradable flexible packages that can be opened and re-closed by the consumer.

In one embodiment, the invention is directed to a biodegradable re-closeable flexible package, including the following elements:
  biodegradable front and back walls, each including a first side, a second side, a top and a bottom;
  the biodegradable front and back walls being joined together at the respective first sides, second sides and bottoms;
  a re-closeable mouth defined by the top of the front wall and the top of the back wall; and
  a biodegradable zipper positioned at the top of the front wall and the top of the back wall, the biodegradable zipper including at least one interlocking element connected to the front wall and at least one interlocking element connected to the back wall;
  the biodegradable zipper being movable between a first open position that disengages the at least one interlocking element connected to the front wall from the at least one interlocking element connected to the back wall and a second closed position that engages the at least one interlocking element connected to the front wall to the at least one interlocking element connected to the back wall;
  wherein the biodegradable zipper includes about 20% to 100% by weight of a water-soluble polymer and zero to about 80% by weight of a plant-based cellulose material.

In another embodiment, the invention is directed to a biodegradable zipper that includes the following elements:
  at least one interlocking element adapted for connection to a first wall of a flexible package; and
  at least one interlocking element adapted for connection to a second wall of the flexible package;
  the biodegradable zipper comprising about 20% to 100% by weight of a water-soluble polymer and zero to about 80% by weight of a plant-based cellulose material;
  the biodegradable zipper being movable between a first open position that disengages the at least one interlocking element adapted for connection to the first wall from the at least one interlocking element adapted for connection to the second wall and a second closed position that engages the at least one interlocking element adapted for connection to the first wall to the at least one interlocking element adapted for connection to the second wall.

In another embodiment, the invention is directed to a method of making a biodegradable zipper for a re-closeable flexible package. The method includes the following steps:
  forming at least one first interlocking element adapted for connection to a first wall of a flexible package using a biodegradable material; and
  forming at least one second interlocking element adapted for connection to a second wall of the flexible package using the biodegradable material;
  the biodegradable zipper being movable between a first open position that disengages the at least one first interlocking element from the at least one second interlocking element and a second closed position that engages the at least one first interlocking element to the at least one second interlocking element;

the biodegradable material comprising about 20% to 100% by weight of a water-soluble polymer and zero to about 80% by weight of a plant-based cellulose material.

With the foregoing in mind, it is a feature and advantage of the invention to provide a fully biodegradable flexible package that can be opened and closed by consumers.

It is also a feature and advantage of the invention to provide a fully biodegradable flexible package that can be filled by consumers with desired contents to desired levels, sealed, and stored for future use.

It is also a feature and advantage of the invention to provide a biodegradable zipper that enables the production of fully biodegradable flexible packages that can be opened and closed by consumers, and the contents varied.

The foregoing characteristics and advantages of the invention will become further apparent from the following Detailed Description, read in conjunction with the drawings.

DETAILED DESCRIPTION OF THE INVENTION

Figure 1:
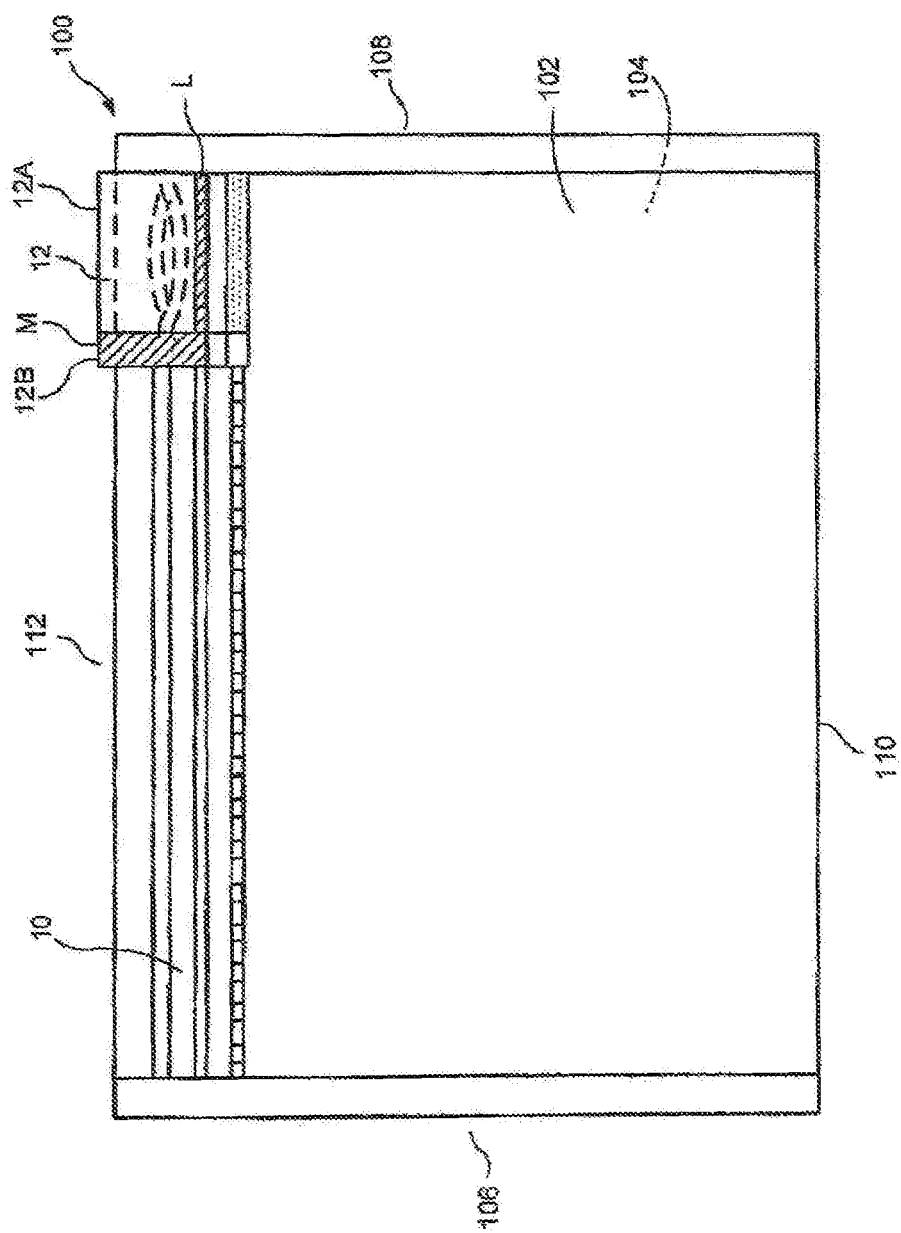
FIG. 1 is a plan view of an exemplary re-closeable flexible package that can be made fully biodegradable according to the invention.

The present invention is directed to a fully biodegradable re-closeable flexible package, a biodegradable zipper for a re-closeable flexible package, and a method of making a biodegradable zipper for a re-closeable flexible package. The biodegradable re-closeable flexible package and the biodegradable zipper can be repulpable, compostable and/or water-soluble and can have any conventional structure that is known in the art of re-closeable flexible packages. The specific structures described herein are exemplary.
Exemplary Structures for Biodegradable Package and Biodegradable Zipper Referring to FIG. 1, a biodegradable (repulpable, compostable and/or water-soluble) re-closeable flexible package 100 includes a biodegradable front wall 102 and a biodegradable back wall 104, each one having a first side 106, a second side 108, a bottom 110 and a top 112. The biodegradable front and back walls 102 and 104 are joined together at their respective first sides 106, second sides 108 and bottoms 110. Each of the respective joinders can be a fold (if the front and back walls are continuous), or a heat seal, or any suitable joint that is essentially permanent and cannot be opened and re-closed.

Figure 2:
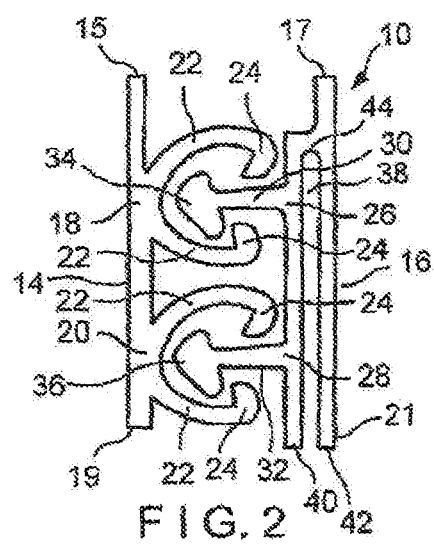
FIG. 2 is a cross-sectional view of a first exemplary embodiment of a biodegradable zipper according to the invention.

The respective tops 112 of the front and back walls 102 and 104 define a mouth that can be opened and closed using a biodegradable (repulpable, compostable and/or water-soluble) zipper 10 defined by interlocking elements (exemplified in FIGS. 2-4) that are connected to the tops 112 of the respective front and back walls. As shown in FIGS. 2, for example, the biodegradable zipper 10 includes at least one (or more than one) first interlocking element 18, 20 connected to the front wall 102 and at least one (or more than one) second interlocking element 26, 28 connected to the back wall 104 of the biodegradable re-closeable flexible package 10. The biodegradable zipper 10 is movable between a first open position that disengages each of the first interlocking elements 18, 20 from each of the second interlocking elements 26, 28, and a second closed position that engages each of the first interlocking elements 18, 20 to each of the respective second interlocking elements 26, 28.

Depending on the specific structure of the biodegradable zipper, the engagement and disengagement of the first and second interlocking elements can be accomplished using manual pressure, in which the consumer uses his or her hands to press the interlocking elements into engagement or separate them into disengagement, or with the aid of a biodegradable (compostable and/or water-soluble) slider 12 having an opening end 12A and a closing end 12B. The slider 12 can be movable between a first position adjacent to the first sides 106 that opens the mouth at the tops 112 and a second position adjacent to the second sides 108 that closes the mouth at the tops 112 of the flexible package 100.

The biodegradable zipper 10 and the biodegradable slider 12 can have a wide variety of configurations. FIG. 2 illustrates a double zipper embodiment with first and second zipper profiles 14 and 16 upwardly terminating in first and second upper flanges 15 and 17, and downwardly terminating in first and second lower flanges 19 and 21. The first interlocking elements 18 and 20 are female interlocking elements formed by arcuate extending arms 22 terminating in detent hooks 24. The second interlocking elements 26 and 28 are male interlocking elements having first and second shafts 30 and 32 terminating in respective first and second arrowhead detent elements 34 and 36. The second zipper profile 16 also includes a hinge structure 38 formed by an inner flange 40, from which the second interlocking elements 26 and 28 extend, and an outer flange 42 joining at pivot point 44 downwardly adjacent from the top surface of second zipper profile 16.

Figure 3:
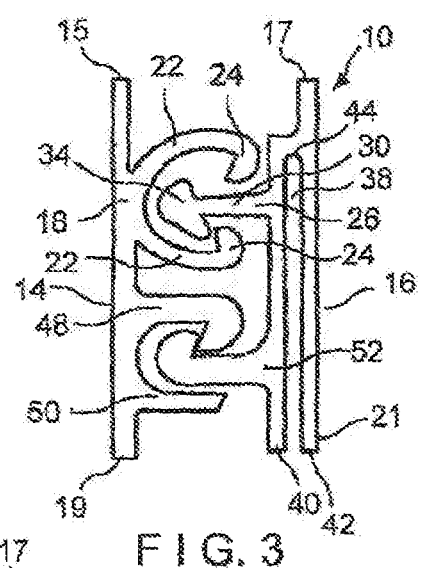
FIG. 3 is a cross-sectional view of a second exemplary embodiment of a biodegradable zipper according to the invention.
Figure 4:
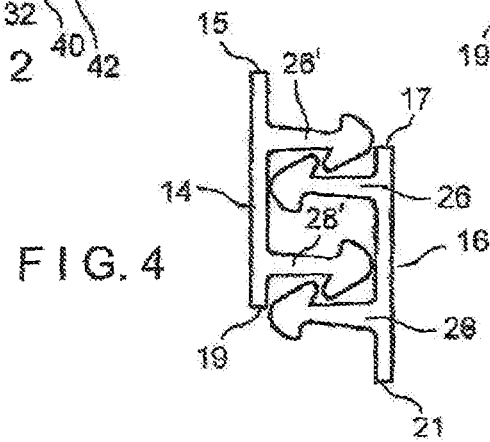
FIG. 4 is a cross-sectional view of a third exemplary embodiment of a biodegradable zipper according to the invention.

The biodegradable zipper 10 shown in FIG. 3 is like that of FIG. 2 except that one of the first interlocking elements 20 is replaced with a first arm 48 with a self-mating hook that can mate with a similar or identical structure, with guide post 50, and one of the second interlocking elements 28 is replaced with a second arm 52 with a self-mating hook. FIG. 4 shows another embodiment of biodegradable zipper 10 having a first zipper profile 14 with first interlocking elements 26' and 28' and a second zipper profile 16 with second interlocking elements 26 and 28, all of which are male elements. In each of the foregoing embodiments, the first interlocking elements can be connected or adapted for connection to the front wall 102, and the second interlocking elements can be connected or adapted for connection to the back wall 104 of the biodegradable, re-closeable flexible package 100. In various embodiments (not shown), the zipper can be continuous between the front and back walls so that the at least one interlocking element connected (or adapted for connection) to the front wall is the same as the at least one interlocking element connected (or adapted for connection) to the back wall.

The biodegradable zipper 10 can include about 20% to 100% by weight of a water-soluble polymer and zero to about 80% by weight of a repulpable and/or compostable material. Suitably, the biodegradable zipper can include about 25% to about 75% by weight of a water-soluble polymer and about 25% to about 75% by weight of a repulpable and/or compostable material, or about 40% to about 60% by weight of a water-soluble polymer and about 40% to about 60% by weight of a repulpable and/or compostable material. The repulpable and/or compostable material can be a plant-based cellulose material as described below.

Water-Soluble Polymers for Biodegradable Zipper

The biodegradable zipper 10 and the biodegradable slider 12 (when present) can include any suitable water-soluble polymer that will dissolve in water or aqueous liquids. Suitable water-soluble polymers include without limitation alkali-soluble polyvinyl acetate copolymers, ethylene-maleic anhydride copolymers, polyacrylates, polyethers, polyvinyl alcohol, ethylene vinyl alcohol, polyvinyl pyrrolidone, polyacrylamides, styrene-maleic anhydride, water-soluble cellulosic ethers, hydroxyethylcellulose, methycellulose, sodium carboxymethylcellulose, and combinations thereof. When present, the biodegradable slider 12 can be formed using the same water-soluble polymer as the remainder of the biodegradable zipper 10, or can be formed using a different (e.g., stiffer) water-soluble polymer.

Alkali-soluble polyvinyl acetate copolymers are soluble in aqueous solutions that have been treated with a base. Suitable polymers include polyvinyl acetate copolymers in which the vinyl acetate is copolymerized with an acidic comonomer. The acid-base reactions dissociate the polymer molecules into liquid monomers, resulting in dissolution. Ethylene-maleic anhydride copolymers include both linear copolymers of ethylene and maleic anhydride and copolymers that have been crosslinked with anhydride, free acid or amide-ammonium salt side chains.

Suitable water-soluble polyacrylates include polymers of acrylic acid, polymers of methacrylic acid, and combinations thereof. Also included are polymers of acrylic acid and polymers of methacrylic acid that have been neutralized with bases to their salt forms. Suitable polyethers include polyoxyethylenes, polymethyl ethyl ethers, and combinations thereof. Polyoxyethylenes are typically waxy and should therefore be used in combination with a stiffer polymer such as ethylene vinyl alcohol or polyvinyl alcohol. Polyvinyl ethers readily dissolve in water at temperatures up to about 35° C. and become less soluble at higher temperatures.

Polyvinyl alcohol and ethylene vinyl alcohol are both soluble in water and possess the structural integrity and flexibility needed for biodegradable zippers, with or without a biodegradable slider. These polymers can be readily extruded into the shapes and profiles that are typical of packaging zippers. These polymers can also be readily heat sealed or laminated onto paper, which can be used to form the walls 102 and 104 of a biodegradable flexible package 100 as described above.

High molecular weight polyvinyl pyrrolidone is soluble in water and various organic solvents. Because of its tackiness, can suitably be combined with another water-soluble polymer and/or a suitable amount of compostable (e.g., plant-based cellulose) material that contributes structural integrity to the biodegradable zipper. High molecular weight polyacrylamide exhibits similar tackiness and can also be combined with another water-soluble polymer that contributes structural integrity. Styrene-maleic anhydride copolymers are soluble in alkaline water and in some organic solvents. These resins can readily be heat sealed or otherwise laminated to paper and other plant-based cellulose materials, the latter of which can be used to form the walls 102 and 104 of a biodegradable flexible package 100 as described above.

Various cellulosic polymers can be used to form the biodegradable zipper 10 of the invention. Water-soluble cellulose ether polymers prepared from alpha-cellulose are hygroscopic and have film-forming properties useful in preparing the water-soluble zippers and connecting them to the front and back walls 102 and 104 of the flexible package. Hydroxyethylcellulose, prepared by reacting alkali cellulose with ethylene oxide, can be made completely water-soluble or only alkali-soluble depending on the extent of the reaction. This polymer can be used alone or in combination with another, and is highly compatible with the foregoing polyvinyl acetate, polyvinyl alcohol and ethylene-vinyl alcohol polymers and copolymers. Polymers of methycellulose and polymers of sodium carboxymethylcellulose also exhibit excellent water-solubility and are compatible with paper and other cellulose materials that can be used to form the front and back walls 102 and 104 of the flexible package 100.

Repulpable and/or Compostable Materials for Biodegradable Zipper

The biodegradable zipper 10 and the biodegradable slider 12 (when present) can include any suitable repulpable and/or compostable material within the ranges stated above. The term "repulpable" refers to a paper or other sheet material that can be converted back into pulp or fibers for possible recycling. The term "compostable" refers to organic matter that decomposes into its natural elements in a natural environment, typically within about 90 days, leaving no toxicity in the soil. For purposes of the biodegradable zipper 10 and biodegradable slider 12, suitable repulpable and/or compostable materials include plant-based cellulose materials. Suitable plant-based cellulose materials include without limitation wood pulp, paper fibers, cotton, linen, silk, wool, and combinations thereof. While other (e.g., noncellulose) materials may qualify as repulpable and/or compostable, the plant-based cellulose materials, combined with suitable amounts of water-soluble polymer, contribute the mechanical and structural integrity that is needed for functioning as a biodegradable zipper 10 for a flexible package.

Materials Used to Form Biodegradable Flexible Package

The materials used to form the biodegradable re-closeable flexible package 100 (excluding the zipper 10) fall into the same two categories. The first category includes water-soluble flexible polymers that dissolve in water, and possibly other liquids, releasing the contents of the package. These types of packages are used for packaging dry, granulated soaps such as laundry and dishwasher soaps, chemical additives, industrial cleaners, paint mixing, and other uses where pre-measured quantities of a substance are advantageous. The second category includes repulpable and/or compostable materials, such as plant-based cellulose materials that are intended to replace disposable non-biodegradable plastic packages. These packages are used for re-closeable packaging of processed foods, consumer storage of foods such as sandwich bags, re-closeable packages for nuts and other condiments, and the like. These types of packages do not require complete dissolution of the package in water.

When the biodegradable flexible package is formed of a water-soluble polymer, suitable polymers may include any of the foregoing polymers and polymer combinations that are useful for the biodegradable zipper. Suitable water-soluble polymers include without limitation alkali-soluble polyvinyl acetate copolymers, ethylene-maleic anhydride copolymers, polyacrylates, polyethers, polyvinyl alcohol, ethylene vinyl alcohol, polyvinyl pyrrolidone, polyacrylamides, styrene-maleic anhydride, water-soluble cellulosic ethers, hydroxyethylcellulose, methycellulose, sodium carboxymethylcellulose, and combinations thereof. In these embodiments, the water-soluble polymer used to form the body of the flexible package 100 (i.e., the front wall 102 and the back wall 104) can be the same water-soluble polymer or polymer combination used to form the zipper 12 or can be a different water-soluble polymer or polymer combination.

When the biodegradable flexible package 100 (excluding the zipper) is formed of a repulpable and/or compostable material, the repulpable and/or compostable material can be plant-based cellulose material. The plant-based cellulose material can include without limitation wood pulp, paper fibers, cotton, linen, silk, wool, and combinations thereof. While other (e.g., non-cellulose) materials may qualify, the plant-based cellulose materials, combined with suitable amounts of water-soluble polymer, contribute the mechanical and structural integrity that is needed for functioning as a front wall 102 and back wall 104 for a flexible package 100.

The biodegradable flexible package 100 can also be formed using a combination of a repulpable and/or compostable material and a water-soluble polymer. Exemplary combinations include without limitation biodegradable flexible packages formed using about 20% to 100% by weight of a water-soluble polymer and zero to about 80% by weight of a plant-based cellulose material, suitably. about 25% to about 75% by weight of a water-soluble polymer and about 25% to about 75% by weight of a plant-based cellulose material, or about 40% to about 60% by weight of a water-soluble polymer and about 40% to about 60% by weight of a plant-based cellulose material.

The biodegradable zipper 10 and flexible package 100 can be designed to satisfy various standards for repulpability and/or compostability. One such standard is whether the cellulose-based material(s) used to form the zipper 12 and flexible package 100 is or are re-pulpable. Re-pulpability can be measured using the Fibre Box Association's (FBA's) "Voluntary Standard for Repulping and Recycling Corrugated Fiberboard Treated to Improve Its Performance in the Presence of Water and Water Vapor," Rev. Aug. 16, 2013, which is incorporated herein by reference.

The biodegradable zipper 10 can be combined with the body (front and back walls) of the biodegradable flexible package 100 using any suitable technique, to form the biodegradable, re-closeable flexible package 100. Suitable techniques include heat sealing, lamination, adhesive bonding, coextrusion and the like. The biodegradable re-closeable flexible package 100 has the advantage of being fully biodegradable while offering the consumer unlimited flexibility to determine or alter the contents of the flexible package or vary the amounts of ingredients contained therein.

The embodiments of the invention described herein are exemplary, and various modifications and improvements can be made without departing from the spirit and scope of the invention. The scope of the invention is defined by the appended claims, and all changes that fall within the meaning and range of equivalents are intended to be embraced therein.

We claim:

1. A biodegradable re-closeable flexible package comprising:
    biodegradable front and back walls, each including a first side, a second side, a top and a bottom;
    the biodegradable front and back walls being joined together at the respective first sides, second sides and bottoms;
    a re-closeable mouth defined by the top of the front wall and the top of the back wall; and
    a biodegradable zipper positioned at the top of the front wall and the top of the back wall, the biodegradable zipper including at least two interlocking elements connected to the front wall below the top of the front wall and at least two opposing interlocking elements connected to the back wall below the top of the back wall; and
    a slider extending from the top of the front wall and the top of the back wall to below the at least two interlocking elements and the at least two opposing interlocking elements;
    the biodegradable zipper being movable between a first open position that disengages the at least two interlocking elements connected to the front wall from the at least two opposing interlocking elements connected to the back wall and a second closed position that engages the at least two interlocking elements connected to the front wall to the at least two opposing interlocking elements connected to the back wall;
    wherein the biodegradable zipper consists of about 20% to less than 100% by weight of a water-soluble polymer and greater than zero to about 80% by weight fibers of a plant-based cellulose material selected from repulpable wood pulp fibers and/or repulpable paper fibers.

2. The biodegradable re-closeable flexible package of claim 1, wherein the biodegradable zipper consists of greater than 90% to less than 100% by weight of the water-soluble polymer and greater than zero to less than 10% by weight of the fibers of the plant-based cellulose material.

3. The biodegradable re-closeable flexible package of claim 1, wherein the biodegradable front and back walls comprise a blend of the same or a different water-soluble polymer and the fibers of the plant-based cellulose material.

4. The biodegradable re-closeable flexible package of claim 1, wherein the slider is a biodegradable slider that is movable between a first position adjacent to the first sides to open the mouth and a second position adjacent to the second sides to close the mouth.

5. The biodegradable, re-closeable flexible package of claim 1, wherein the water-soluble polymer is selected from the group consisting of alkali-soluble polyvinyl acetate copolymers, ethylene-maleic anhydride copolymers, polyacrylates, polyethers, polyvinyl alcohol, ethylene vinyl alcohol, polyvinyl pyrrolidone, polyacrylamides, styrene-maleic anhydride, water-soluble cellulosic ethers, hydroxyethylcellulose, methycellulose, sodium carboxymethylcellulose, and combinations thereof.

6. The biodegradable, re-closeable flexible package of claim 1, wherein the plant-based cellulose material comprises wood pulp fibers.

7. The biodegradable, re-closeable flexible package of claim 1, wherein the plant-based cellulose material comprises paper fibers.

8. The biodegradable, re-closeable flexible package of claim 3, wherein the biodegradable front and back walls consist of the same or different water-soluble polymer and the fibers.

9. A biodegradable zipper, comprising:
    at least two adjacent first interlocking elements adapted for positioning below a top of a first wall of a flexible package; and
    at least two adjacent second opposing interlocking elements adapted for positioning below a top of a second wall of the flexible package; and
    a slider adapted to extend from the top of the front wall and the top of the back wall to below the at least two interlocking elements and the at least two opposing interlocking elements;

the flexible package having a re-closeable mouth defined by the top of the front wall and the top of the back wall;

the biodegradable zipper consisting of about 20% to less than 100% by weight of a water-soluble polymer and greater than zero to about 80% by weight fibers of a plant-based cellulose material selected from repulpable wood pulp fibers and/or repulpable paper fibers;

the biodegradable zipper being movable between a first open position that disengages the at least two adjacent first interlocking elements from the at least two adjacent second opposing interlocking elements and a second closed position that engages the at least two adjacent first interlocking elements to the at least two adjacent second opposing interlocking elements.

10. The biodegradable zipper of claim 9, wherein the biodegradable zipper consists of greater than 90% to less than 100% by weight of the water-soluble polymer and greater than zero to 10% by weight of the fibers of the plant-based cellulose material.

11. The biodegradable zipper of claim 9, wherein the slider is a biodegradable slider that is movable between a first position that disengages the at least two adjacent first interlocking elements from the at least two adjacent second opposing second interlocking elements and a second position that engages the at least one two adjacent first interlocking elements to the at least two adjacent second opposing second interlocking elements.

12. The biodegradable zipper of claim 9, wherein the water-soluble polymer is selected from the group consisting of alkali-soluble polyvinyl acetate copolymers, ethylene-maleic anhydride copolymers, polyacrylates, polyethers, polyvinyl alcohol, ethylene vinyl alcohol, polyvinyl pyrrolidone, polyacrylamides, styrene-maleic anhydride, water-soluble cellulosic ethers, hydroxyethylcellulose, methylcellulose, sodium carboxymethylcellulose, and combinations thereof.

13. The biodegradable zipper of claim 9, wherein the water-soluble polymer comprises a polyacrylate selected from the group consisting of polymers of acrylic acid, polymers of methacrylic acid, and combinations thereof.

14. The biodegradable zipper of claim 9, wherein the water-soluble polymer comprises a polyether selected from the group consisting of polyoxyethylenes, polymethyl ethyl ethers, and combinations thereof.

15. The biodegradable zipper of claim 9, wherein the water-soluble polymer comprises polyvinyl alcohol and/or ethylene vinyl alcohol.

16. The biodegradable zipper of claim 9, wherein the water-soluble polymer comprises a water-soluble cellulosic ether.

17. The biodegradable zipper of claim 9, wherein the water-soluble polymer is selected from the group consisting of polymers of hydroxyethylcellulose, methylcellulose, sodium carboxymethylcellulose, and combinations thereof.

18. A method of making a biodegradable zipper for a re-closeable flexible package, comprising the steps of:

forming at least two adjacent first interlocking elements adapted for positioning below a top of a first wall of a flexible package using a biodegradable material; and forming at least two adjacent second opposing second interlocking elements adapted for positioning below a top of second wall of the flexible package using the biodegradable material; and forming a slider adapted to extend from the top of the front wall and the top of the back wall to below the at least two interlocking elements and the at least two opposing interlocking elements;

the flexible package having a re-closeable mouth defined by the top of the front wall and the top of the back wall;

the biodegradable zipper being movable between a first open position that disengages the at least two adjacent first interlocking elements from the at least two adjacent opposing second interlocking elements and a second closed position that engages the at least two adjacent first interlocking elements to the at least two adjacent opposing second interlocking elements;

the biodegradable material consisting of about 20% to less than 100% by weight of a water-soluble polymer and greater than zero to about 80% by weight fibers of a plant-based cellulose material selected from repulpable wood pulp fibers and/or repulpable paper fibers.

* * * * *